United States Patent
Schwartz et al.

(10) Patent No.: US 7,401,023 B1
(45) Date of Patent: Jul. 15, 2008

(54) SYSTEMS AND METHODS FOR PROVIDING AUTOMATED DIRECTORY ASSISTANCE USING TRANSCRIPTS

(75) Inventors: Richard Mark Schwartz, Arlington, MA (US); Han Shu, Billerica, MA (US); John Makhoul, Winchester, MA (US); Long Nguyen, Stoneham, MA (US)

(73) Assignees: Verizon Corporate Services Group Inc., New York, NY (US); BBN Technologies Corp., Cambridge, MA (US)

( * ) Notice: Subject to any disclaimer, the term of this patent is extended or adjusted under 35 U.S.C. 154(b) by 1641 days.

(21) Appl. No.: 09/656,264

(22) Filed: Sep. 6, 2000

(51) Int. Cl.
*G10L 21/00* (2006.01)
*H04M 3/42* (2006.01)

(52) U.S. Cl. .................. 704/275; 704/277; 379/218.01
(58) Field of Classification Search .................. 704/270, 704/275, 277; 379/218.01, 218.02
See application file for complete search history.

(56) References Cited

U.S. PATENT DOCUMENTS

| | | | | |
|---|---|---|---|---|
| 4,959,855 A * | 9/1990 | Daudelin | ................ | 379/213.01 |
| 5,185,781 A | 2/1993 | Dowden et al. | | |
| 5,638,425 A | 6/1997 | Meador et al. | | |
| 5,642,519 A * | 6/1997 | Martin | ................ | 704/9 |
| 5,799,065 A | 8/1998 | Junqua et al. | | |
| 5,839,106 A | 11/1998 | Bellegarda | ................ | 704/257 |
| 5,839,107 A | 11/1998 | Gupta et al. | | |
| 5,987,414 A * | 11/1999 | Sabourin et al. | ................ | 704/270 |
| 5,995,929 A | 11/1999 | Gupta | | |
| 6,018,708 A * | 1/2000 | Dahan et al. | ................ | 704/244 |
| 6,021,384 A | 2/2000 | Gorin et al. | | |
| 6,052,693 A | 4/2000 | Smith et al. | | |
| 6,122,361 A * | 9/2000 | Gupta | ................ | 379/223 |
| 6,122,614 A * | 9/2000 | Kahn et al. | ................ | 704/235 |
| 6,138,100 A * | 10/2000 | Dutton et al. | ................ | 704/275 |
| 6,199,087 B1 | 3/2001 | Blake et al. | | |
| 6,397,179 B2 * | 5/2002 | Crespo et al. | ................ | 704/242 |
| 6,584,185 B1 * | 6/2003 | Nixon | ................ | 379/201.01 |
| 6,615,172 B1 * | 9/2003 | Bennett et al. | ................ | 704/257 |
| 6,628,772 B1 * | 9/2003 | McGrath et al. | ................ | 379/218.01 |
| 6,665,640 B1 * | 12/2003 | Bennett et al. | ................ | 704/257 |
| 6,668,044 B1 * | 12/2003 | Schwartz et al. | ................ | 379/68 |
| 6,754,326 B2 * | 6/2004 | Cox et al. | ................ | 379/218.01 |
| 6,789,060 B1 * | 9/2004 | Wolfe et al. | ................ | 704/235 |

* cited by examiner

*Primary Examiner*—Michael N Opsasnick (57) ABSTRACT

An automated directory assistance (130) includes a training system (210) and a directory assistance system (220). The training system (210) trains and maintains the directory assistance system (220). The training system (210) includes a transcription module (310), a speech grammar estimation module (330), a listings statistics estimation module (340), and a required words determination module (350). The transcription module (310) obtains transcripts relating to directory service requests. The speech grammar estimation module (330) creates an n-gram grammar for multiple telephone numbers from the transcripts. The listings statistics estimation module (340) identifies words used to refer to each of the telephone numbers from the transcripts. The required words determination module (350) identifies at least one word that is required to request each of the telephone numbers from the transcripts. The directory assistance system (210) includes a speech recognition module (510), a listing retrieval module (520), and an accept/reject module (530). The speech recognition module (510) receives an audible request for a telephone number from a caller and generates a transcript from the audible request. The listing retrieval module (520) retrieves at least one listing corresponding to the audible request from a database using the transcript. The accept/reject module (530) determines whether to accept one or more of the listings retrieved by the listing retrieval module (520) and presents a telephone number corresponding to the accepted listing to the caller.

32 Claims, 8 Drawing Sheets

SYSTEMS AND METHODS FOR PROVIDING AUTOMATED DIRECTORY ASSISTANCE USING TRANSCRIPTS

BACKGROUND OF THE INVENTION

A. Field of the Invention

The present invention relates generally to communication systems and, more particularly, to systems and methods that provide automated directory assistance.

B. Description of Related Art

Conventional telephone directory assistance requires a large number of people at great expense. Conventional systems have attempted to automate some of the calls for the most frequently requested listings using speech recognition. A typical system requires a large effort on the part of experts to set up and maintain the system. For example, the experts first determine the few most frequently requested listings (FRLs) and then record and transcribe calls to human operators.

For each of the FRLs, the experts design a small grammar specifying the various ways that each listing might be said. This is necessary because people rarely ask for the listing by saying it exactly as it appears in the telephone directory. They leave out parts of the listing (e.g., "Sears" instead of "Sears, Roebuck and Company Department Store"). They insert extra words (e.g., "K-Mart Department Store" instead of "K-Mart"). They insert extraneous words (e.g., "Uh I want the number for Sears, please"). They abbreviate listings (e.g., "DMV" for "Department of Motor Vehicles"). They also use other names entirely (e.g., "The phone company" instead of "Verizon").

It is very hard to predict what people will say for each listing. Therefore, the experts usually create a grammar from several real examples. This is labor intensive, however.

Typically, the experts group the grammars for each of the FRLs to make a grammar for all of them. This makes it possible to recognize requests for any of the FRLs as long as the request is phrased in one of the ways anticipated by the experts. Most requests, however, are not for one of the FRLs, but for some other listing. In this case, the conventional systems detect that the requested number is not one of the FRLs and route the call to a human directory assistance operator.

As a result, a need exists for an automated directory assistance system that automates a larger number of listings than conventional systems.

SUMMARY OF THE INVENTION

Systems and methods consistent with the present invention address this need by providing automated directory assistance that uses large vocabulary speech recognition and information retrieval techniques to automate a large number of listings, and mechanisms for setting up and maintaining the automated directory assistance.

In accordance with the purpose of the invention as embodied and broadly described herein, an automated directory assistance system includes a speech recognition module, a listing retrieval module, and an accept/reject module. The speech recognition module receives an audible request for a telephone number from a caller and generates a transcript from the audible request. The listing retrieval module retrieves at least one listing corresponding to the audible request from a database using the transcript. The accept/reject module determines whether to accept one or more of the listings retrieved by the listing retrieval module and presents a telephone number corresponding to the accepted listing to the caller.

One mode of operation for this system relies on having transcriptions of actual telephone calls to directory assistance. These calls may be used to derive the language model for recognition, to retrieve the appropriate telephone number, and to allow estimation of acoustic models. In one implementation consistent with the present invention, the actual telephone calls are transcribed by humans.

In another implementation consistent with the present invention, a system for generating transcripts used by an automated directory assistance service includes a grammar creation component and a speech recognition component. The grammar creation component creates a loose grammar for multiple telephone numbers using grammar rules and general phrases. The speech recognition component generates a transcript of a directory assistance call using the loose grammar.

In yet another implementation consistent with the present invention, a method for generating transcripts used to configure an automated directory assistance service includes creating a loose grammar for multiple telephone numbers using grammar rules and general phrases; generating a transcript of a directory assistance call using the loose grammar and knowledge of a telephone number that was given out by a human operator for the directory assistance call; producing a confidence score for the generated transcript; and determining whether the generated transcript is acceptable based on the confidence score for the generated transcript.

In another implementation consistent with the present invention, a system for training an automated directory assistance service includes a transcription module, a speech grammar estimation module, a listings statistics estimation module, and a required words determination module. The transcription module obtains transcripts relating to directory service requests. The speech grammar estimation module creates an n-gram grammar for multiple telephone numbers from the transcripts. The listings statistics estimation module identifies words used to refer to each of the telephone numbers from the transcripts. The required words determination module identifies at least one word that is required to request each of the telephone numbers from the transcripts.

In a further implementation consistent with the present invention, a directory assistance system includes a training system and a directory assistance system. The training system includes a transcription module, a speech grammar estimation module, a listings statistics estimation module, and a required words determination module. The transcription module obtains training transcripts relating to directory service requests. The speech grammar estimation module creates an n-gram grammar for multiple telephone numbers from the training transcripts. The listings statistics estimation module identifies words used to refer to each of the telephone numbers from the training transcripts and stores the words as listings in a database. The required words determination module identifies at least one word that is required to request each of the telephone numbers from the training transcripts.

The directory assistance system includes a speech recognition module, a listing retrieval module, and an accept/reject module. The speech recognition module receives an audible request for a telephone number from a caller and generates a transcript from the audible request using the n-gram grammar. The listing retrieval module retrieves at least one listing corresponding to the audible request from the database using the transcript. The accept/reject module determines whether to accept the listing retrieved by the listing retrieval module based on the at least one required word of sufficiently high confidence and presents a telephone number corresponding to the accepted listing to the caller.

In another implementation consistent with the present invention, a method for providing a directory assistance service includes receiving a request for a telephone number from a caller, the request being spoken by the caller and including a location and listing corresponding to the telephone number; using large vocabulary speech recognition to recognize at least one word spoken by the caller when making the request; using statistical information retrieval to identify a listing corresponding to the recognized word; determining whether the listing is likely to be correct; and providing a telephone number corresponding to the listing to the caller.

In yet another implementation consistent with the present invention, a method for providing a directory assistance service includes receiving a request for a telephone number from a caller, the request being spoken by the caller and including a location and listing corresponding to the telephone number; using large vocabulary speech recognition to recognize at least one word spoken by the caller when making the request; using statistical information retrieval to identify a listing corresponding to the recognized word; and connecting the caller to a called party corresponding to the listing.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention automate directory assistance using large vocabulary speech recognition and information retrieval techniques to service a wide range of telephone number requests. The systems and methods also provide mechanisms for automatically generating transcripts used to train and maintain the automated directory assistance.

Exemplary Network

Figure 1:
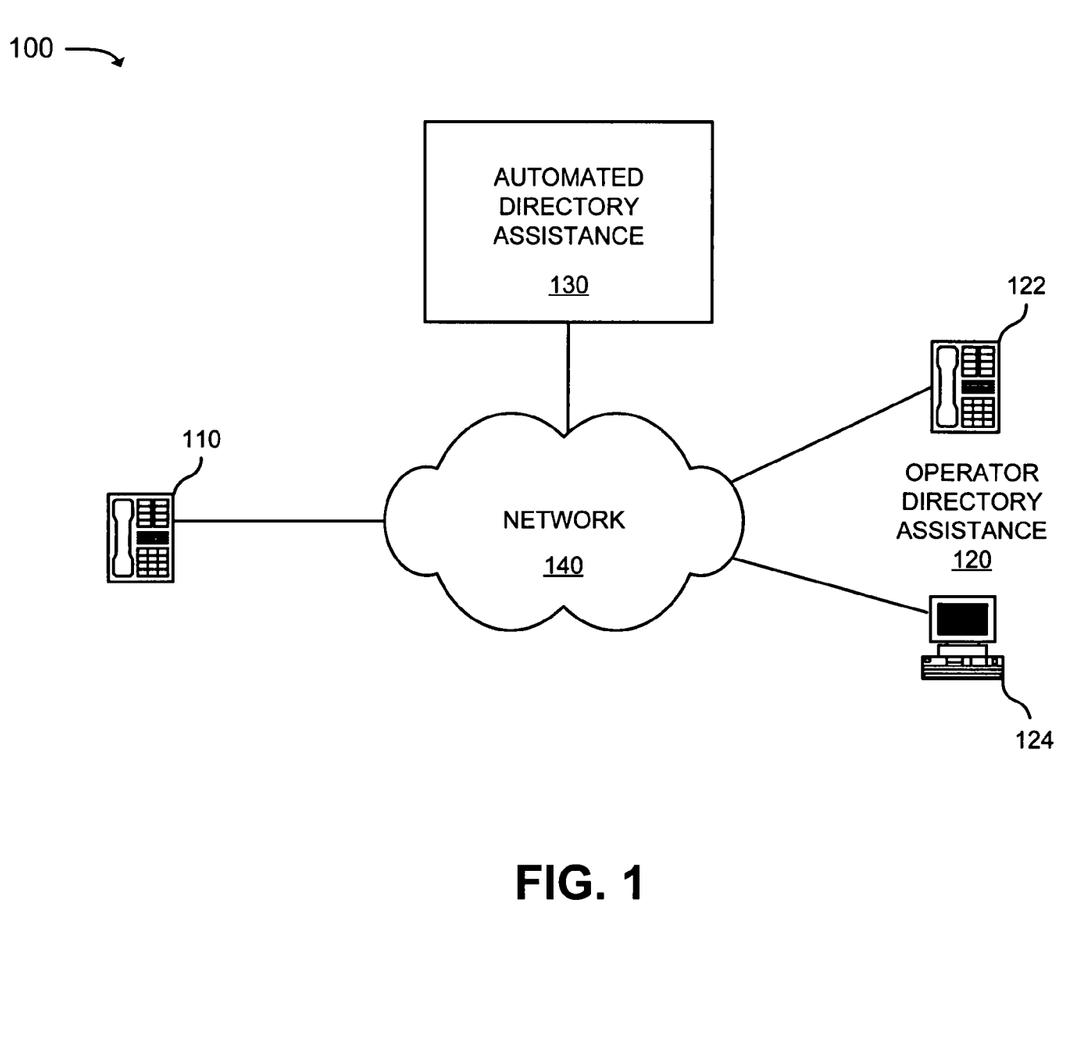
FIG. 1 is an exemplary diagram of a network in which systems and methods consistent with the present invention may be implemented.

FIG. 1 is a diagram of an exemplary network 100 in which systems and methods consistent with the present invention may be implemented. The network 100 may include caller device 110 connected to operator directory assistance 120 and automated directory assistance 130 via a network 140. The network 140 may include one or more networks, such as the public switched telephone network (PSTN), the Internet, an intranet, a local area network (LAN), a wide area network (WAN), etc., that permit the caller device 110, the operator directory assistance 120, and the automated directory assistance 130 to communicate.

The caller device 110 may include a conventional communications device capable of communicating over the network 140 via a wired, wireless, or optical connection. The caller device 110 may include a wired or wireless telephone, a personal or portable computer, a personal digital assistant (PDA), or a similar device. The operator directory assistance 120 may include one or more communications devices operated by one or more human operators. The communications devices may include a telephone device 122, a computer device 124, or a similar device. While only a single caller device and two exemplary operator directory assistance devices have been shown in FIG. 1, one of ordinary skill in the art would recognize that the network 100 may include additional and/or different devices.

Figure 2:
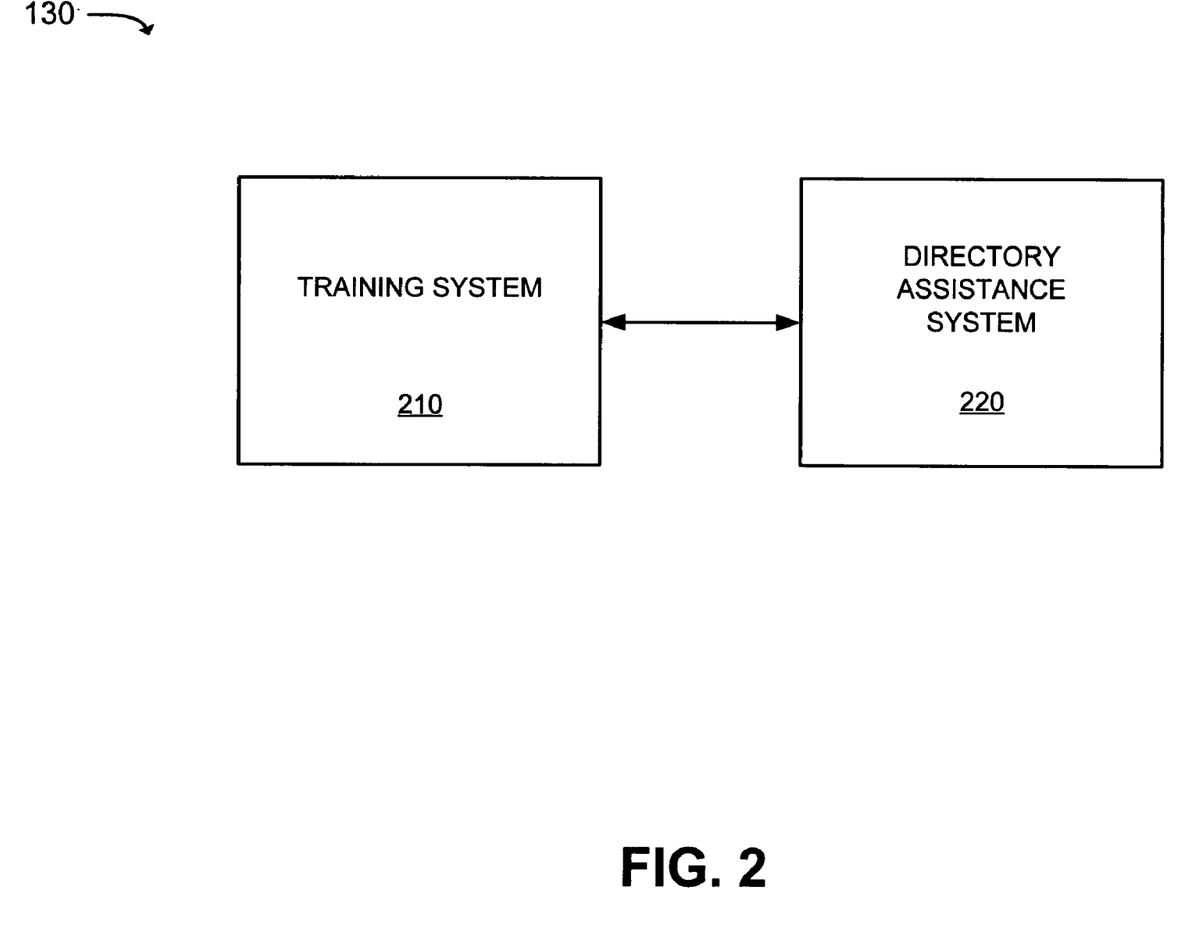
FIG. 2 is an exemplary diagram of the automated directory assistance of FIG. 1 in an implementation consistent with the present invention.

The automated directory assistance 130 may include one or more computer devices, or the like, that operate upon a request for a telephone number from a caller device, such as the caller device 110, to provide the telephone number and/or a connection to the desired called party. FIG. 2 is an exemplary diagram of the automated directory assistance 130 according to an implementation consistent with the present invention. The automated directory assistance 130 may include a training system 210 and a directory assistance system 220. The training system 210 trains and configures the directory assistance system 220. The directory assistance system 220 services telephone number requests from caller devices.

Figure 3:
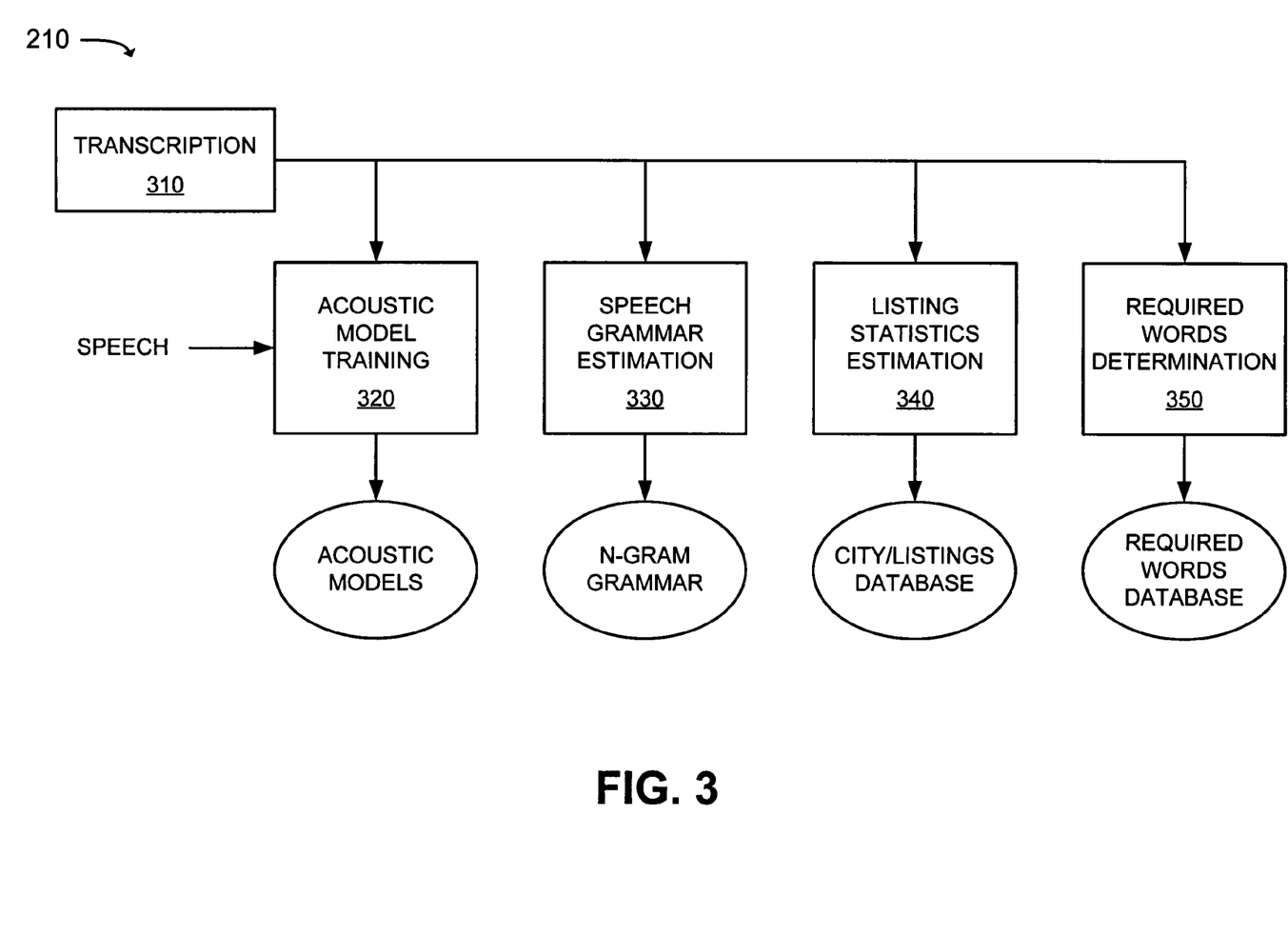
FIG. 3 is an exemplary diagram of the training system of FIG. 2 in an implementation consistent with the present invention.

FIG. 3 is an exemplary diagram of the training system 210 according to an implementation consistent with the present invention. The training system 210 may include a transcription module 310, an acoustic model training module 320, a speech grammar estimation module 330, a listing statistics estimation module 340, and a required words determination module 350. These modules may be implemented in hardware, software, or a combination of hardware and software.

The transcription module 310 provides transcripts corresponding to recorded requests for telephone numbers. The transcription module 310 may obtain these transcripts in at least two different ways. In some implementations consistent with the present invention, the transcription module 310 uses human transcribers to create the transcripts from previously-recorded calls or from a phone book. In alternate implementations consistent with the present invention, the transcription module 310 automatically generates the transcripts. The transcription module 310 may also use a combination of human and automatic processing.

Figure 4:
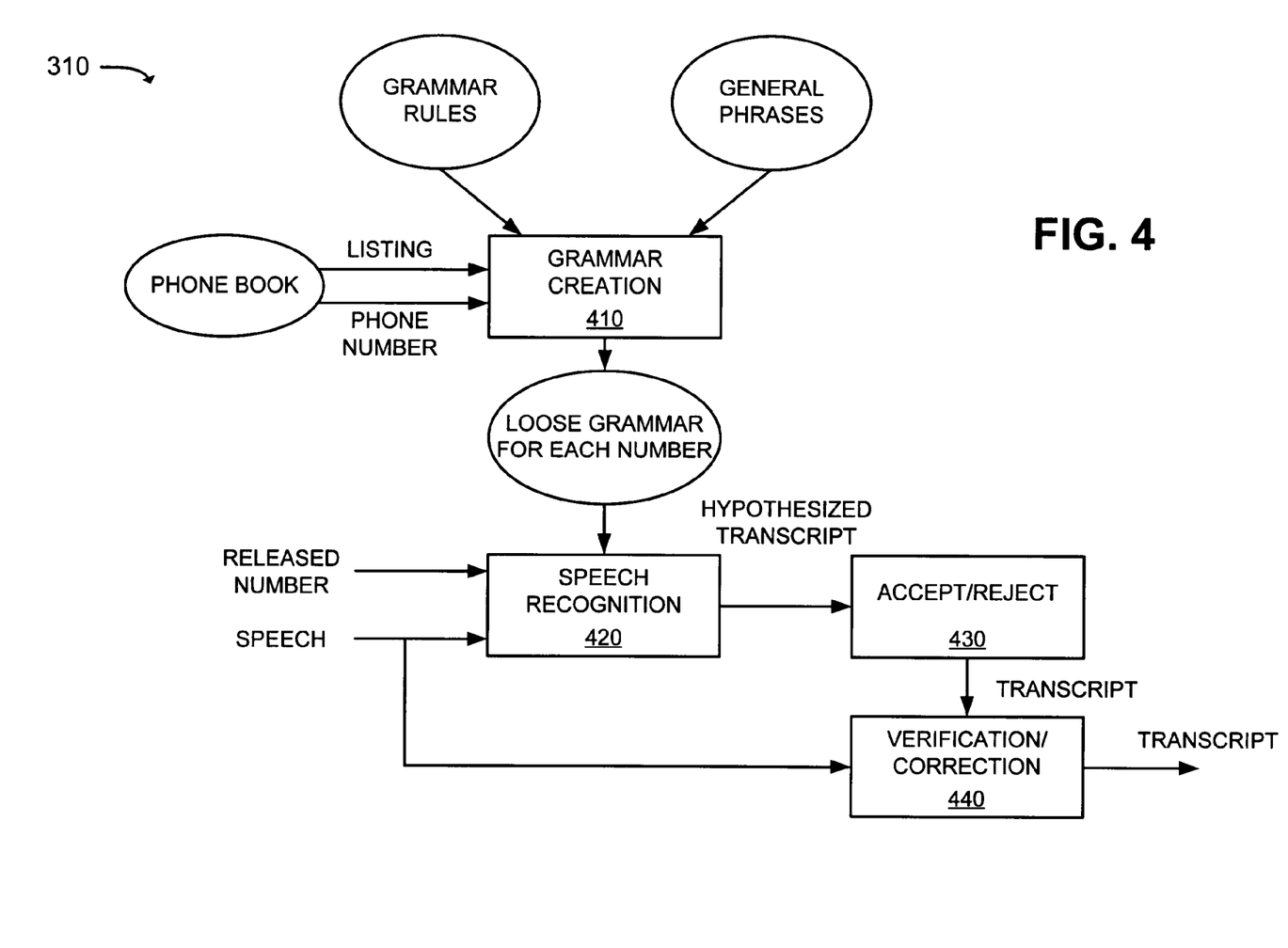
FIG. 4 is an exemplary diagram of an automatic transcription module that may be used by the training system of FIG. 3 in an implementation consistent with the present invention.

FIG. 4 is an exemplary diagram of the transcription module 310 in accordance with these alternate implementations consistent with the present invention. The transcription module 310 may include a grammar creation component 410, a speech recognition component 420, optionally an accept/reject component 430, and optionally a verification/correction component 440. These components may be implemented in hardware, software, or a combination of hardware and software. The verification/correction component 440 may take the form of one or more human parties.

The grammar creation component 410 operates upon at least three sources of information: a phone book, grammar rules, and general phrases. The grammar creation component 410 may use the phone book to obtain listings corresponding to telephone numbers in the phone book. The grammar creation component 410 may use conventional manual or automatic techniques to translate the listings.

The transcription module 310 needs phonetic spellings for all of the words that will be recognized. One automatic technique predicts phonetic spellings for words included in the listings, aligns the predicted spelling with the manual spelling, and creates a confusion matrix therefrom. From the confusion matrix, the technique expands the predicted spelling of new words into a network of possible spellings and recognizes the most likely phonemes.

The grammar rules may include a very broad set of rules (e.g., anything that is plausible) for possible words and/or phrases that might be used to refer to a listing. For example, the grammar rules may include alternate words, such as "DMV" for a listing for the "Department of Motor Vehicles." The general phrases may include additional or extraneous words that may be provided when referring to any listing, such as "I want the number for," "Please give me the number for," "I need," etc.

The grammar creation component 410 may use the phone book, grammar rules, and general phrases to create a loose grammar for each telephone number. The grammar is loose because it may include all of the ways that someone may plausibly request the listing. The grammar creation component 410 may store this loose grammar in a database accessible by the speech recognition component 420.

The speech recognition component 420 may include a conventional speech recognizer, such as BYBLOS or HARK manufactured by GTE Corporation, to generate a hypothesized transcript based on the spoken (audio) request from a caller, the telephone number given by a human directory assistance operator, and the loose grammar created by the grammar creation component 410. The speech recognition component 420 may convert the audio request to digital form and use the loose grammar corresponding to the telephone number given by the human operator to recognize the words spoken by the caller. From this, the speech recognition component 420 may generate the hypothesized transcript.

In at least one implementation consistent with the present invention, the speech recognition component 420 provides the hypothesized transcript to the accept/reject component 430. The accept/reject component 430 may operate upon a set of criteria to determine whether the hypothesized transcript is accurate or meets some threshold of accuracy. The accept/reject component 430 may generate a confidence value based on its determination. At this point in the process, the transcription module 310 does not yet have transcriptions for how people ask for these telephone numbers, so the confidence values may be based on acoustic measures and other mechanisms.

There are many methods that may be used to determine the confidence value for the recognized transcript. For example, the accept/reject component 430 may compare the confidence scores of each of the recognized words with the scores for an arbitrary sequence of phonemes. The accept/reject component 430 may also consider other information, such as the length of each word or the amount of training for each word. The transcription module 310 may use the information provided by the telephone number given out by the operator to narrow down the possibilities, and then also try to determine when the recognized transcript is correct.

The verification/correction component 440 may verify all of the transcripts that were produced automatically and make corrections, as necessary. The verification/correction may be performed quickly by one or more human parties to eliminate the errors present in the automatically-produced transcripts.

Returning to FIG. 3, the acoustic model training module 320, the speech grammar estimation module 330, the listing statistics estimation module 340, and the required words determination module 350 operate upon the transcripts from the transcription module 310. The acoustic model training module 320 may estimate acoustic models, such as Hidden Markov Models (HMMs) that are used in speech recognition. The acoustic model training module 320 analyzes examples of speech waveforms to compute the statistics of the spectral parameters therefrom. Using the spectral parameters and the corresponding transcripts, the acoustic model training module 320 gathers the speech and the corresponding text of what was said. The acoustic model training module 320 expands the text using a phonetic dictionary into phonemes and then estimates the acoustic models (i.e., the parameters of the HMMs) that are used in speech recognition.

The speech grammar estimation module 330 may create a statistical n-gram grammar using transcripts (i.e., words and phrases) from the transcription module 310. In other words, the speech grammar estimation module 330 takes all of the words/phrases that callers have used for all of the listings and estimates an n-gram grammar. The statistical n-gram grammar estimates the likelihood of each single word, each pair of words, each triplet of words, etc. For a tri-gram grammar, for example, the speech grammar estimation module 330 determines, given any two preceding words, the probability of each possible third word.

The listing statistics estimation module 340 may generate a city/listings database from the transcripts from the transcription module 310. The listing statistics estimation module 340 uses the transcripts to identify all of the words and phrases that have been used to refer to a particular telephone number. The listing statistics estimation module 340 concatenates these words and phrases to form a document or file relating to the particular telephone number. The listing statistics estimation module 340 then stores the document in a database, such as the city/listings database. The city/listings database stores a separate document for each telephone number and these documents are searchable using a word or phrase from a transcript (as described later).

One technique that the training system 210 may use to determine whether the retrieved listing was correct is to compare the recognized utterance with a set of "required words." The technique allows for multiple sets of required words and requires that the recognized utterance match one of the sets to some degree. For example, for the Department of Motor Vehicles, the training system 210 might accept the words "Department, Motor, Vehicles," or "Registry, Vehicles," or it might also accept "DMV" as an alternative. The training system 210 may allow the user to say other words as well, as long as the required words are spoken.

The required words determination module 350 may identify one or more words or lists of words, using the transcripts, that must be used to request a particular telephone number and store the word or words in a required words database. To generate this word or list of words, the required words determination module 350 may remove all of the "stop" words from transcripts of requests for each listing. Stop words are words that are considered useless, such as "Please," "I want," etc.

The required words determination module 350 may then count the number of times that each distinct word or phrase was used and identify which of these words or phrases are required based on some pre-established criteria. For example, the criteria may require that a word or phrase occur at least some minimum number of times (e.g., 2) and/or that the word or phrase account for at least some minimum percentage (e.g., 10%) of the transcripts to constitute a required word or phrase. These required minimums may be modified to trade off false rejection against false acceptance. If the minimums are raised, there will be fewer required words or phrases, resulting in higher false rejection with correspondingly lower false acceptance.

Figure 5:
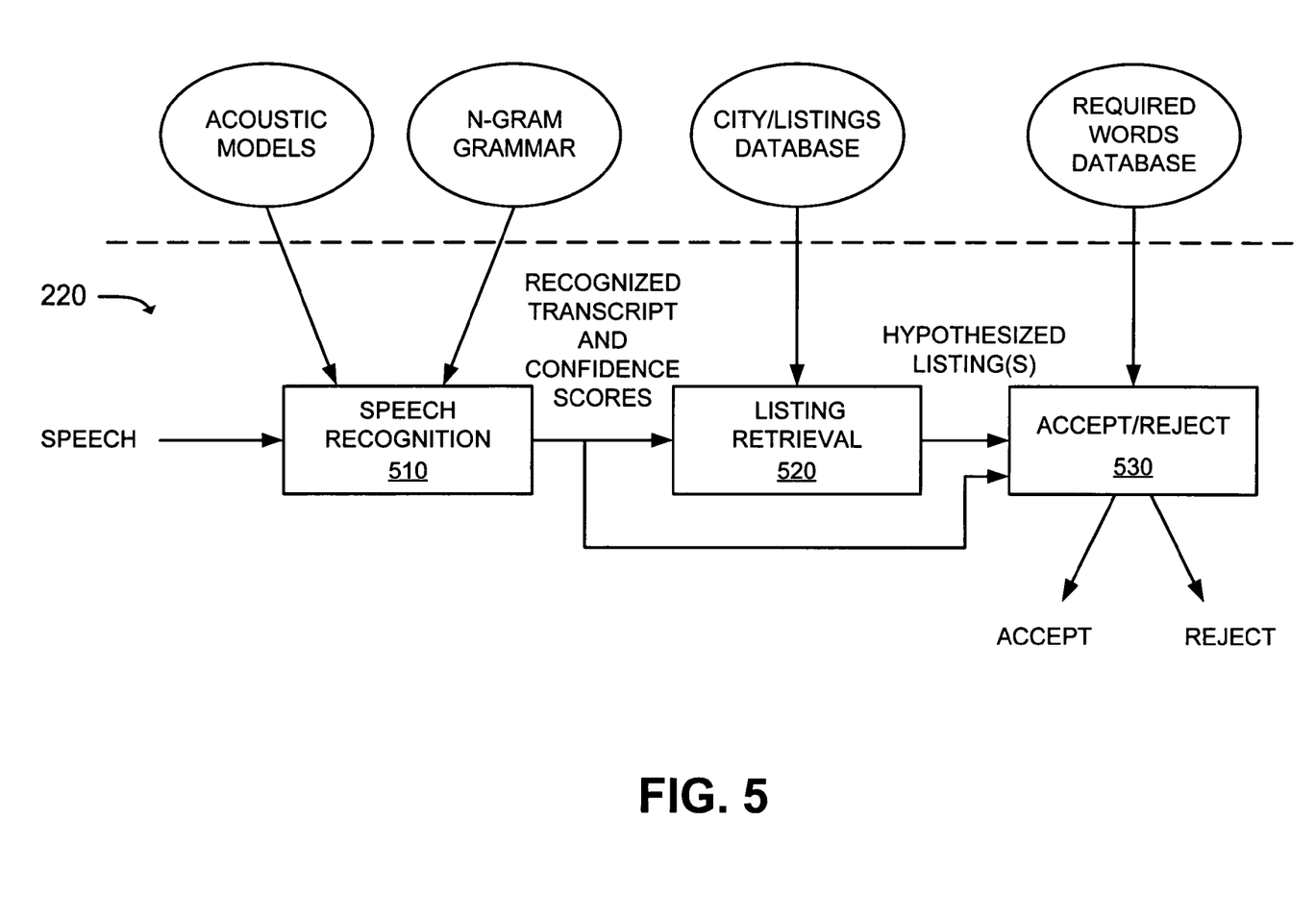
FIG. 5 is an exemplary diagram of the directory assistance system of FIG. 2 in an implementation consistent with the present invention.

Returning to FIG. 2, the training system 210 uses the above modules to train and configure the directory assistance system 220. The directory assistance system 220 services telephone number requests from caller devices, such as the caller device 110. FIG. 5 is an exemplary diagram of the directory assistance system 220 in an implementation consistent with the present invention. The directory assistance system 220 may include a speech recognition module 510, a listing retrieval module 520, and an accept/reject module 530.

The speech recognition module 510 may include a conventional large vocabulary recognizer, such as BYBLOS or HARK, that receives speech from a caller and generates a recognized transcript therefrom. The speech recognition module 510 may convert the audible speech from the caller to a digital format, record it, and use the acoustic models and speech grammar to recognize the word or phrase (i.e., sequence of words) spoken by the caller. The speech recognition module 510 uses the recognized word or phrase to generate a recognized transcript corresponding to the word(s) spoken by the caller.

In addition to a transcription of the user's utterance, the speech recognition module 510 may also produce a confidence score for each word in the recognized transcript as well as a confidence score for the whole transcript. This confidence score reflects the likelihood that this word or utterance has been recognized correctly. If the confidence score for the whole transcript is sufficiently low, the entire utterance may be rejected. The word confidence scores may be used by the accept/reject module 530 as described below.

The listing retrieval module 520 may include a statistical information retrieval system, such as the statistical document retrieval system described in U.S. patent application Ser. No. 09/127,685, filed Jul. 31, 1998, that uses the recognized transcript from the speech recognition module 510 as a query into the city/listings database. The listing retrieval module 520 finds the most likely listing(s) in the city/listings database given the recognized transcript and generates a list of hypothesized listings. The listing retrieval module 520 may use the prior probability of a request for a particular telephone number as well as the probability that a request for that telephone number would result in the words that were spoken. If the listing retrieval module 520 finds more than one potential listing, the listing retrieval module 520 may rank them based on their potential relevance. Conversely, the listing retrieval module 520 may reject the transcript if no listings are above a specified threshold.

The accept/reject module 530 uses the recognized transcript, the hypothesized listing, and the required words database to determine whether to accept or reject a hypothesized listing. The accept/reject module 530 may use the hypothesized listing as a query or index into the required words database to determine what word or list of words are required for the particular listing. The accept/reject module 530 then determines whether the recognized transcript from the speech recognition module 510 contains the required word or list of words.

For the accept/reject module 530 to accept the hypothesized listing, the accept/reject module 530 must find one or more of the required word lists in the recognized transcript. The accept/reject module 530 may ignore other words in the transcript, as well as the order of the words. If the accept/reject module 530 finds none of the required words in the transcript, it rejects the hypothesized listing. If the listing is rejected, the accept/reject module 530 may forward a recording of the caller's request to a human operator, such as an operator in the operator directory assistance 120 (FIG. 1), to service the request.

In addition to requiring that certain words be found in the caller's utterance, the accept/reject module 530 may reject the listing if the word confidence score produced by the speech recognition module 510 for any of the required words is below a specified threshold.

Exemplary Training Processing

Figure 6:
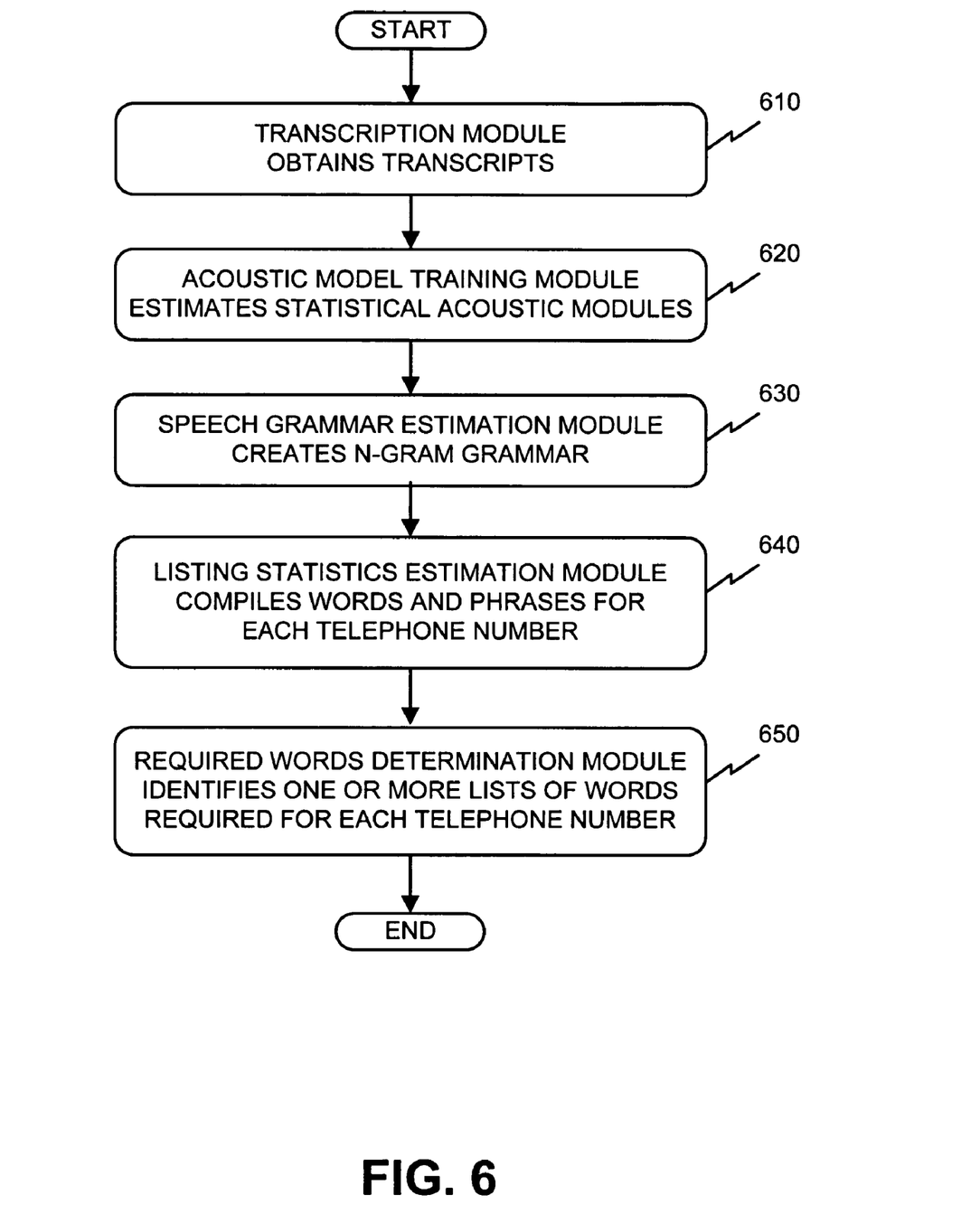
FIG. 6 is a flowchart of exemplary processing for training a directory assistance system according to an implementation consistent with the present invention.

FIG. 6 is a flowchart of exemplary processing for training a directory assistance system according to an implementation consistent with the present invention. While a series of steps are shown, the steps may be performed in a different order and/or concurrently.

Transcripts of user requests are used at several stages of the training system 210. Processing begins with the transcription module 310 obtaining transcripts corresponding to requests for telephone numbers [step 610]. These requests may be actual, previously-recorded calls from callers serviced by human directory assistance operators. Because these calls are prior calls that were already serviced, the transcription module 310 knows not only what the callers said, but what telephone numbers were given out by the directory assistance operators.

The transcription module 310 may obtain the transcripts either manually or automatically. In the manual process, human transcribers create the transcripts from previously-recorded calls or from a phone book. It can be expensive, however, to transcribe a large number of utterances manually. Therefore, to produce transcripts at reduced cost, the transcription module 310 may use an automatic procedure or a semi-automatic one in which the automatic procedure is followed by a human verification stage.

Figure 7:
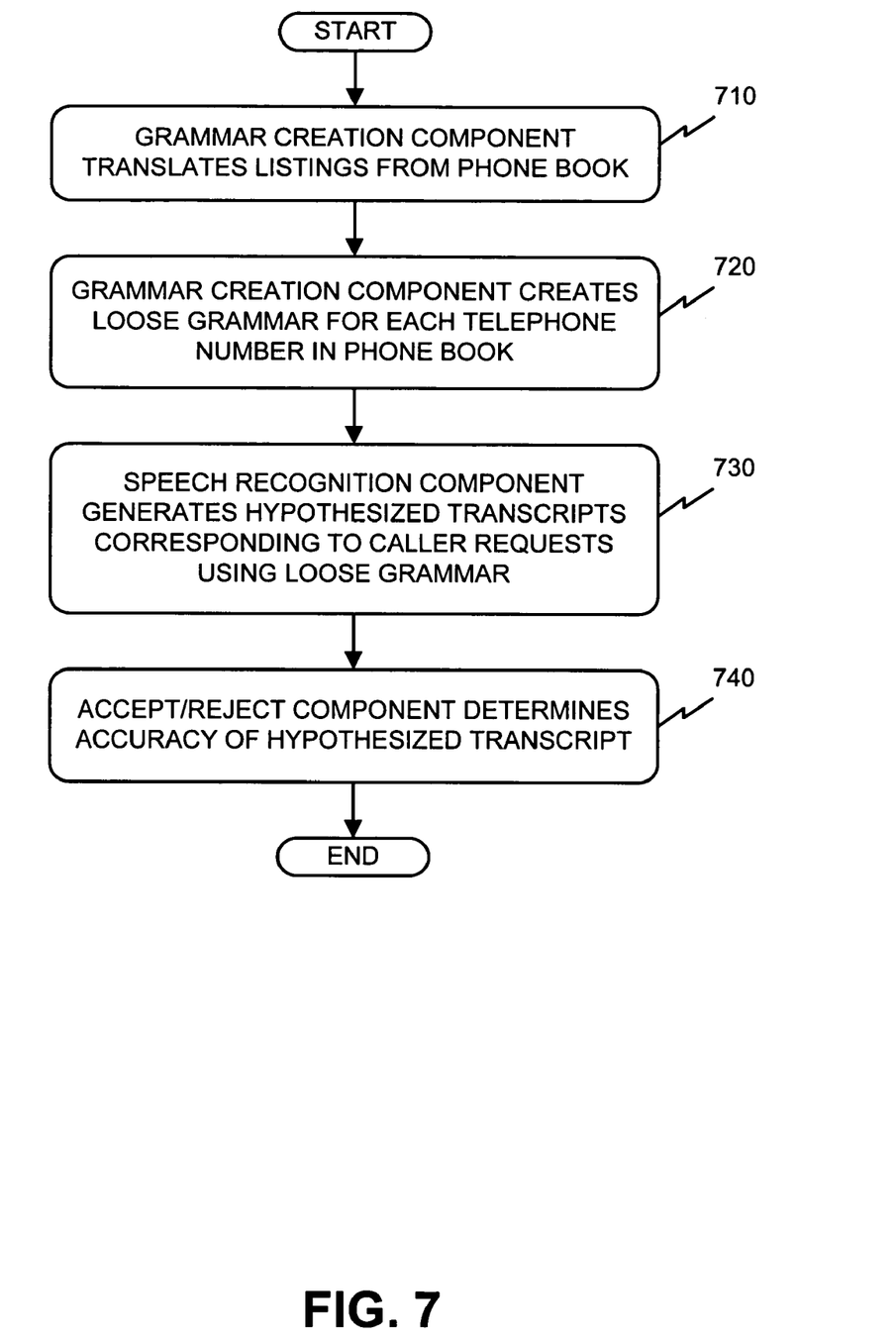
FIG. 7 is a flowchart of exemplary processing for automatically generating transcripts according to an implementation consistent with the present invention.

In the automatic process, the transcription module 310 generates the transcripts from the previously-recorded calls and the phone book. FIG. 7 is a flowchart of exemplary processing for automatically generating transcripts according to an implementation consistent with the present invention. The grammar creation component 410 (FIG. 4) may obtain listings from a phone book and translate them [step 710]. The grammar creation component 410 may use one of several conventional techniques to translate the listings to electronic form. The grammar creation component 410 may use the translated listing, a broad set of grammar rules, and a set of general phrases to create a loose grammar for each telephone number in the phone book [step 720]. The grammar is loose because it may include all of the ways that someone may plausibly request the corresponding telephone number.

The speech recognition component 420 may receive a recorded request from a caller, along with the telephone number provided by a human directory assistance operator. The caller request may be one of many examples that the speech recognition component 420 uses to create a transcript. The speech recognition component 420 may convert the audio request to digital form using a conventional conversion technique. The speech recognition component 420 may then generate a hypothesized transcript corresponding to the recorded caller request [step 730]. The speech recognition component 420 uses the loose grammar, corresponding to the telephone number provided by the human operator for this request, to recognize the word(s) spoken by the caller. The speech recognition component 420 produces the hypothesized transcript, which is the recognized sequence of words. It may also produce a confidence score for each word and/or for the whole utterance.

The accept/reject component 430 may determine the accuracy of the hypothesized transcript(s) [step 740]. The accept/reject component 430 may determine whether a transcript is accurate or meets some threshold of accuracy by determining whether the transcript contains one or more words that are required for the particular listing. Other techniques may alternatively be used. For example, it may also reject a transcript based on the word or utterance confidence scores.

At this stage of preparation, a complete list of required words for each telephone number may not exist because the required words are determined from the set of transcripts of calls requesting a particular number. Therefore, the accept/reject component 430 may use the statistical confidences produced by the speech recognition component 420 to accept or reject the transcript. If the confidence scores are sufficiently high, the transcript may be accepted.

Assume, for example, that a recorded call contains a request from a caller, such as "Please give me the number for the DMV" and that the telephone number provided by the human operator was 703-555-1212. Assume further that the required words for this listing include "DMV" and "motor vehicle." In this case, the grammar creation component 410 may create a loose grammar for telephone number 703-555-1212 that includes words, such as "department, "motor," "vehicles," "DMV," "state," "driver," "license," "plate," "registration," "driving," etc., along with general phrases, such as "I want the number for," "please give me the number for," etc.

The speech recognition component 420 receives the recorded call (i.e., "Please give me the number for the DMV") and the telephone number (i.e., 703-555-1212) given out by the operator. The speech recognition component 420 converts the recorded call to digital form and identifies the loose grammar corresponding to the telephone number 703-555-1212. The speech recognition component 420 may use the telephone number as an index into a database of loose grammars created by the grammar creation component 410. The speech recognition component 420 uses the loose grammar in a conventional manner to recognize the words spoken by the caller and includes these words in a hypothesized transcript. Suppose, for example, that the hypothesized transcript includes the word "DMV."

The accept/reject component 430 may then determine the accuracy of the hypothesized transcript. The accept/reject component 430 may compare the hypothesized transcript to the required words. In this case, the word "DMV" appears in both the transcript and the required words. Therefore, the accept/reject component 430 accepts the transcript.

The automatic transcription process may reject sentences for which the confidence scores are not high enough. This may result in many utterances being rejected even though the automatic transcription was correct or nearly correct. In addition, the automatic transcription process might produce some incorrect transcripts that are accepted by the accept/reject component 430. These problems may be alleviated by human verification/correction component 440.

The verification/correction component 440 may use three ranges of confidence scores. If the confidence scores produced by the speech recognition module 420 are sufficiently high (i.e., above a high threshold), the transcript is accepted automatically. If they are sufficiently low (i.e., below a low threshold), the transcript may be rejected without human intervention. If they are in between the high and low thresholds, the recorded speech may be played to a human as the transcript of the recognized transcript is displayed. The human may also be shown the phone book entry for the telephone number that was given out by the operator.

In one implementation consistent with the present invention, the human merely accepts or rejects the transcript. This requires a very small fraction of the time that would have been required for the human to transcribe the utterance manually. Yet, it avoids discarding any utterance that has been automatically transcribed correctly or keeping any transcripts that are incorrect. In another implementation consistent with the present invention, the human may choose to make some corrections to the recognized transcript. This can still be much faster than a manual transcription process. Depending on how the two thresholds are set, the amount of human intervention can be controlled. For example, if the two thresholds are very close together, the human will examine very few transcripts.

Returning to FIG. 6, the acoustic model training module 320 (FIG. 3) estimates acoustic models using examples of recorded caller requests and the transcripts from the transcriptions module 310 [step 620]. For example, the acoustic model training module 320 may analyze the speech waveforms of the caller requests and use the corresponding transcripts to estimate the acoustic models used in speech recognition. The speech grammar estimation module 330 may create a statistical n-gram grammar using the transcripts from the transcriptions module 310 [step 630]. For example, the speech grammar estimation module 330 may estimate the likelihood of each word, each pair of words, each triplet of words, etc. from all of the words and phrases callers have used to refer to any of the listings.

The listing statistics estimation module 340 uses the transcripts to gather all of the words and phrases that have been used to refer to a particular telephone number [step 640]. The listing statistics estimation module 340 may concatenate these words and phrases to form a document and store them in a city/listings database.

The required words determination module 350 uses the transcripts to identify word(s) or phrase(s) that are required for each telephone number [step 650]. For example, the required words determination module 350 may count the number of times that each distinct word or phrase was used to request a particular telephone number and identify those words or phrases that are required based on some pre-established criteria.

Exemplary Directory Assistance Processing

Figure 8:
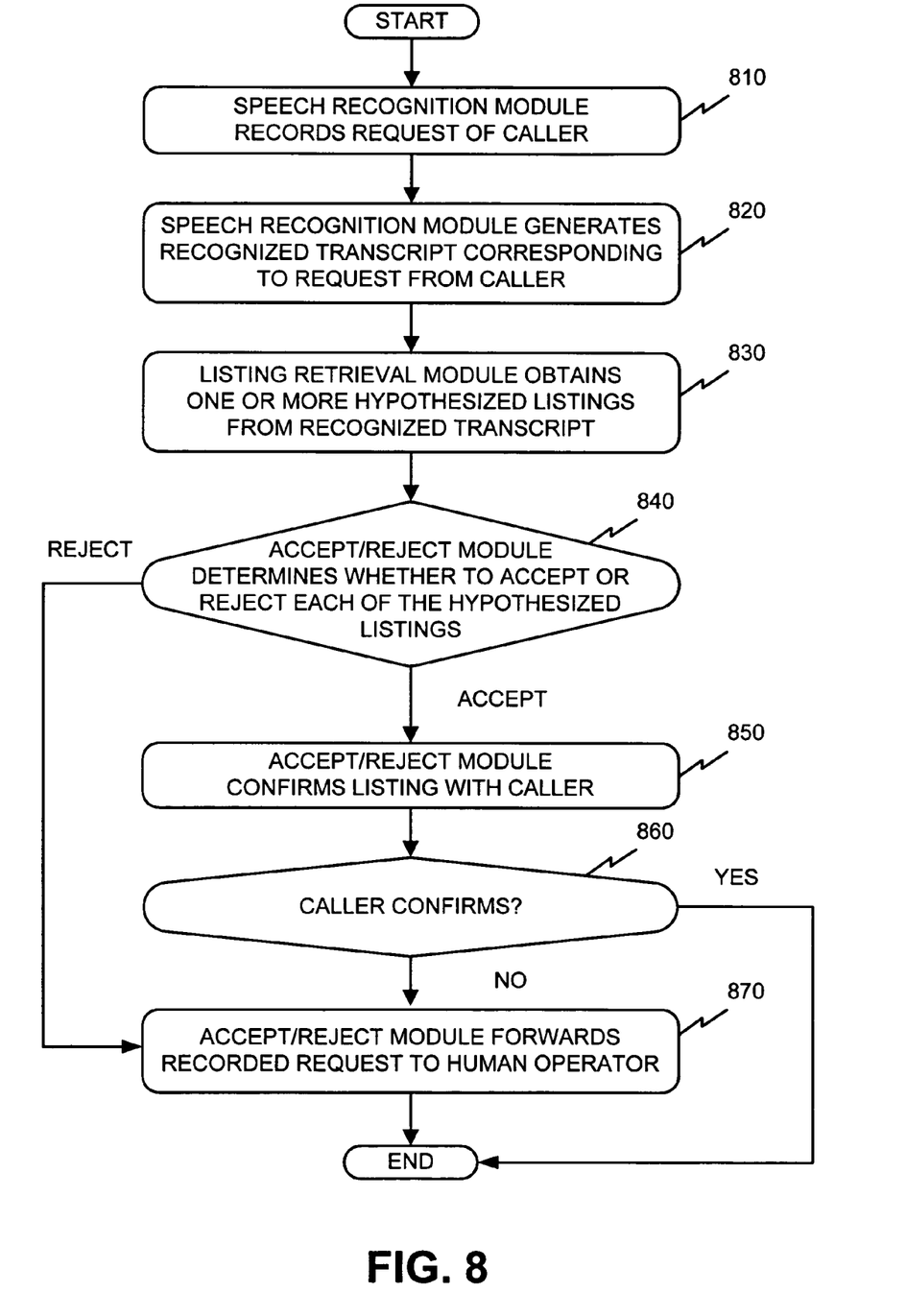
FIG. 8 is an exemplary flowchart of directory assistance processing according to an implementation consistent with the present invention.

FIG. 8 is an exemplary flowchart of directory assistance processing according to an implementation consistent with the present invention. Processing begins with a caller making a call to the automated directory assistance 130 (FIG. 1) to request a telephone number. The caller may use a caller device, such as the caller device 110, to contact the automated directory assistance 130. The automated directory assistance 130 may use interactive voice response (IVR) technology to prompt the caller for the city and listing the caller desires. When prompted for the city and listing, the caller may provide the information by speaking into the caller device 110. The directory assistance system 220 (FIG. 2) within the automated directory assistance 130 may record the caller's spoken request [step 810].

The speech recognition module 510 (FIG. 5) within the directory assistance system 220 may convert the recorded request to digital form and, using the acoustic models and speech grammar, recognize the word or phrase spoken by the caller. The speech recognition module 510 uses the recognized word or phrase to generate a recognized transcript corresponding to the request from the caller [step 820]. The listing retrieval module 520 may use the recognized transcript as a query into the city/listings database to obtain one or more hypothesized listings corresponding to the caller's request [step 830]. The listing retrieval module 520 may use conventional information retrieval techniques to retrieve the hypothesized listings from the database or it may use the statistical information retrieval technique described in U.S. patent application Ser. No. 09/127,685, filed Jul. 31, 1998.

The accept/reject module 530 may determine whether to accept or reject each of the hypothesized listings [step 840]. The accept/reject module 530 may make this determination based on the estimated accuracy of the listings and the confidence scores associated with the listings. The accept/reject module 530 may use each of the hypothesized listings to identify the word(s) that are required for the particular listing. The accept/reject module 530 then determines whether the recognized transcript includes the required word(s). If the recognized transcript contains the required word(s) corresponding to one or more of the hypothesized listings with a sufficiently high confidence score, the accept/reject module 530 accepts the listing. If the confidence score falls in a middle range, the accept/reject module 530 may confirm the listing with the caller [step 850]. The accept/reject module 530 may use IVR technology to provide the listing audibly to the caller and the caller may confirm the listing with an audible response or through manipulation of the caller device 110 [step 860].

If the caller indicates that the listing(s) are incorrect or if the accept/reject module 530 rejects all of the listings, the accept/reject module 530 may provide the recorded request from the caller to a human operator for service [step 870]. If the caller indicates that the listing is correct, processing ends. In this case, the automated directory assistance 130 may automatically provide the telephone number associated with the listing or it may connect the caller to the called party associated with the listing.

CONCLUSION

Systems and methods consistent with the present invention provide automated directory assistance that uses large vocabulary speech recognition and information retrieval techniques to service a wide range of telephone number requests. The systems and methods also provide mechanisms for automatically generating transcripts for training and maintaining the automated directory assistance.

The automated directory assistance consistent with the present invention has several advantages over conventional systems. First, it facilitates the automation of a large number of listings in a large number of locations by using large vocabulary recognition techniques for both recognition and rejection. Second, it automates grammar creation for each listing, thereby eliminating extensive labor to determine the grammar for each listing. Third, it provides flexibility in that it permits automation even when the request is phrased in a slightly novel way. Fourth, it is more lenient to recognition errors by using probabilistic information retrieval techniques to choose among multiple listings when several are possible. Fifth, it may be implemented with a few or no examples of transcripts.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while the transcription module 310 and the directory assistance system 220 have been described as part of the same automated directory assistance 130, this need not be the case. In other implementations consistent with the present invention, the transcription module 310 and the directory assistance system 220 are implemented separately within different systems.

The scope of the invention is defined by the claims and their equivalents.

The invention claimed is:

1. An automated directory assistance system, comprising:
   a speech recognition module configured to receive an audible request for a telephone number from a caller and generate a transcript from the audible request;
   a listing retrieval module configured to retrieve a listing corresponding to the audible request from a database, the listing retrieval module being configured to use the transcript as a query, the database storing words previously included in requests for telephone numbers; and
   an accept/reject module configured to determine whether to accept the listing retrieved by the listing retrieval module and present a telephone number corresponding to the accepted listing to the caller, the listing being rejected unless the transcript contains at least one of the stored words.

2. The system of claim 1, wherein the speech recognition module includes a large vocabulary speech recognizer.

3. The system of claim 1, wherein the speech recognition module is configured to use acoustic models and an n-gram grammar to recognize at least one word included in the audible request.

4. The system of claim 1, wherein the listing retrieval module includes a statistical information retrieval system.

5. The system of claim 1, wherein the listing retrieval module is configured to rank a plurality of listings from the database.

6. The system of claim 1, wherein the accept/reject module is configured to identify at least one word that is required for the listing, determine whether the transcript contains the identified at least one required word, and accept the listing when the transcript contains the identified at least one required word.

7. The system of claim 1, wherein the accept/reject module is further configured to transfer the audible request to a human operator when the accept/reject module does not accept the listing.

8. The system of claim 1, further comprising:
   a training system configured to automatically configure the speech recognition module, the listing retrieval module, and the accept/reject mode.

9. The system of claim 8, wherein the training system includes:
   an acoustic model training module configured to estimate acoustic models from training transcripts relating to previous requests for the telephone numbers, the telephone numbers including the telephone number corresponding to the listing; and a speech grammar estimation module configured to create an n-gram grammar for the telephone numbers, the speech recognition module using the acoustic models and the n-gram grammar to generate the transcript from the audible request.

10. The system of claim 8, wherein the training system includes:
a listings statistics estimation module configured to identify words used when requesting the telephone number, the listing retrieval module retrieving the identified words using the transcript.

11. The system of claim 8, wherein the training system includes:
a required words determination module configured to identify at least one word that is required to request the telephone number, the accept/reject module using the identified at least one required word to determine whether the listing is acceptable.

12. The system of claim 8, wherein the training system includes:
a transcription module configured to automatically generate training transcripts corresponding to previous requests for the telephone numbers, the telephone numbers including the telephone number.

13. The system of claim 12, wherein the transcription module includes:
a grammar creation component configured to create a loose grammar corresponding to each of the telephone numbers, and
a speech recognition component configured to generate a training transcript for one of the previous requests for the telephone numbers using the loose grammar.

14. The system of 13, wherein the transcription module further includes:
an accept/reject component configured to determine whether the generated training transcript is acceptable.

15. The system of claim 14, wherein the transcription module further includes:
a verification/correction module configured to present the generated training transcript to a human for at least one of verification and modification.

16. A method for providing directory assistance, comprising:
receiving an audible request for a telephone number from a caller;
generating a transcript from the audible request;
retrieving a listing corresponding to the audible request from a database using the transcript as a query into the database, the database storing words previously included in requests for telephone numbers;
determining whether to accept the retrieved listing, the listing being rejected unless the transcript contains at least one of the stored words; and
presenting a telephone number corresponding to the accepted listing to the caller.

17. The method of claim 16, comprising:
estimating acoustic models from speech and training relating to requests for the telephone numbers; and
creating an n-gram grammar for the telephone numbers.

18. The method of claim 17, wherein the generating includes:
using the acoustic models and the grammar to recognize at least one word included in the audible request.

19. The method of claim 16, further comprising:
identifying words relating to each of the telephone numbers, the telephone numbers including the telephone number; and
storing the words in the database.

20. The method of 19, wherein the retrieving includes:
using the transcript as a query into database to retrieve the words relating to the telephone number.

21. The method of claim 16, wherein the retrieving includes:
retrieving a plurality of listings from the database, the listings corresponding to the audible request; and
ranking the plurality of listings.

22. The method of claim 16, wherein the determining includes:
identifying at least one word that is required for the listing,
determining whether the transcript contains the identified at least one required word, and
accepting the retrieved listing when the transcript contains the identified at least one required word.

23. The method of claim 16, comprising:
retrieving a plurality of listings corresponding to the audible request; and
transferring the audible request to a human operator when none of the plurality of retrieved listings are accepted.

24. The method of claim 16, further comprising:
automatically generating training transcripts corresponding to previous requests for the telephone numbers, the telephone numbers including the telephone number.

25. The method 24, wherein the automatically generating includes:
creating a loose grammar corresponding to each of the telephone numbers, and
generating a training transcript for one of the previous requests for one of the telephone numbers using the loose grammar.

26. The method of claim 25, wherein the automatically generating includes:
determining whether the generated transcript is acceptable.

27. The method of claim 26, wherein the automatically generating further includes:
presenting the transcript to a human for at least one of verification and modification.

28. A system for providing automated directory assistance, comprising:
means for receiving a request for a telephone number from a caller;
means for generating a transcript from the request;
means for retrieving a listing corresponding to the request from a database using the transcript as a query, the database storing words previously included in requests for telephone numbers, the query including matching the transcript to the stored words;
means for determining whether to accept the retrieved listing; and
means for presenting a telephone number corresponding to the accepted listing to the caller.

29. A computer-readable medium that stores instructions executable by at least one processor to perform a method for providing directory assistance, comprising:
recognizing at least one word in an audible request for a telephone number received from a caller;
generating a transcript from the audible request;
retrieving at least one listing corresponding to the audible request from a database using the transcript as a query, the database storing words previously included in requests for telephone numbers, the query including matching the transcript to the stored words;

determining whether to accept one or more of the retrieved listings; and presenting a telephone number corresponding to the accepted one or more listings to the caller.

30. A method for providing a directory assistance service, comprising:

receiving a request for a telephone number from a caller, the request being spoken by the caller and including a location and listing corresponding to the telephone number;

using large vocabulary speech recognition to recognize at least one word spoken by the caller when making the request;

generating a transcript from the at least one word;

using statistical information retrieval and the transcript to identify a listing corresponding to the recognized word, including using the transcript as a query, the listings database storing words previously included in requests for telephone numbers, the query including matching the transcript to the stored words;

determining whether the listing is likely to be correct; and providing a telephone number corresponding to the listing to the caller.

31. A method for providing a directory assistance service, comprising:

receiving a request for a telephone number from a caller, the request being spoken by caller and including a location and listing corresponding to the telephone number;

using large vocabulary speech recognition to recognize at least one word spoken by the caller when making the request;

generating a transcript from at least one word;

using statistical information retrieval and the transcript to identity a listing corresponding to the recognized word, the statistical information retrieval matching the transcript to words previously included in requests for telephone numbers; and connecting the caller to a called party corresponding to the listing.

32. A method of providing directory assistance, comprising:

defining a set of words or phrases associated with a listing;

defining at least one required word associated with the listing;

receiving a request for a telephone number from a caller;

using speech recognition to generate a transcript from the audible request;

using the transcript to identify the listing as a potential match to the request, the listing being identified by using the transcript as a query into a database containing the set of words or phrases associated with the listing, the set of words or phrases associated with the listing being previously included in requests for telephone numbers;

determining whether the transcript includes the at least one required word associated with the listing;

accepting the listing when it is that the transcript includes a match for at least one of the at least one required word; and rejecting the listing when it is determined that the transcript does not include a match for at one of the at least one required word.

\* \* \* \* \*